(12) United States Patent
Tracht et al.

(10) Patent No.: US 7,540,529 B2
(45) Date of Patent: Jun. 2, 2009

(54) VEHICLE SEAT ASSEMBLY

(75) Inventors: Michael L. Tracht, Ingolstadt (DE); Rainer Penzel, Munich (DE)

(73) Assignee: Lear Corporation, Southfield, MI (US)

( * ) Notice: Subject to any disclaimer, the term of this patent is extended or adjusted under 35 U.S.C. 154(b) by 420 days.

(21) Appl. No.: 10/904,828

(22) Filed: Dec. 1, 2004

(65) Prior Publication Data

US 2006/0113758 A1  Jun. 1, 2006

(51) Int. Cl.
*B60R 21/207* (2006.01)
(52) U.S. Cl. .................................. 280/730.2
(58) Field of Classification Search .............. 280/730.2; B60R 21/207
See application file for complete search history.

(56) References Cited

U.S. PATENT DOCUMENTS

| | | | |
|---|---|---|---|
| 5,437,470 A * | 8/1995 | Terai et al. ............... | 280/728.3 |
| 5,498,030 A | 3/1996 | Hill et al. | |
| 5,678,853 A | 10/1997 | Maly | |
| 5,749,597 A | 5/1998 | Saderholm | |
| 5,762,363 A | 6/1998 | Brown et al. | |
| 5,816,610 A | 10/1998 | Higashiura et al. | |
| 5,826,938 A * | 10/1998 | Yanase et al. .......... | 297/216.13 |
| 5,860,673 A | 1/1999 | Hasegawa et al. | |
| 5,863,063 A | 1/1999 | Harrell | |
| 5,927,749 A | 7/1999 | Homier et al. | |
| 5,938,232 A | 8/1999 | Kalandek et al. | |
| 5,967,603 A | 10/1999 | Genders et al. | |
| 6,045,151 A | 4/2000 | Wu | |
| 6,155,593 A * | 12/2000 | Kimura et al. ........... | 280/728.2 |
| 6,224,092 B1 * | 5/2001 | Sakamoto et al. ........ | 280/730.2 |
| 6,237,934 B1 | 5/2001 | Harrell et al. | |
| 6,588,838 B1 | 7/2003 | Dick, Jr. et al. | |

FOREIGN PATENT DOCUMENTS

| | | |
|---|---|---|
| DE | 199 15 831 A1 | 10/2000 |
| DE | 101 60 974 A1 | 6/2003 |
| EP | 0 768 216 A1 | 4/1997 |
| JP | 8-324372 | 12/1996 |
| JP | 10-166987 | 6/1998 |

OTHER PUBLICATIONS

U.S. Appl. No. 08/808,572, filed Feb. 28, 1997, Wu et al.

* cited by examiner

*Primary Examiner*—Paul N. Dickson
*Assistant Examiner*—Joselynn Y. Sliteris
(74) *Attorney, Agent, or Firm*—Brooks Kushman P.C.

(57) ABSTRACT

A vehicle seat assembly having a back panel. The back panel is configured to flex to create a gap through which an air bag is deployed.

20 Claims, 4 Drawing Sheets

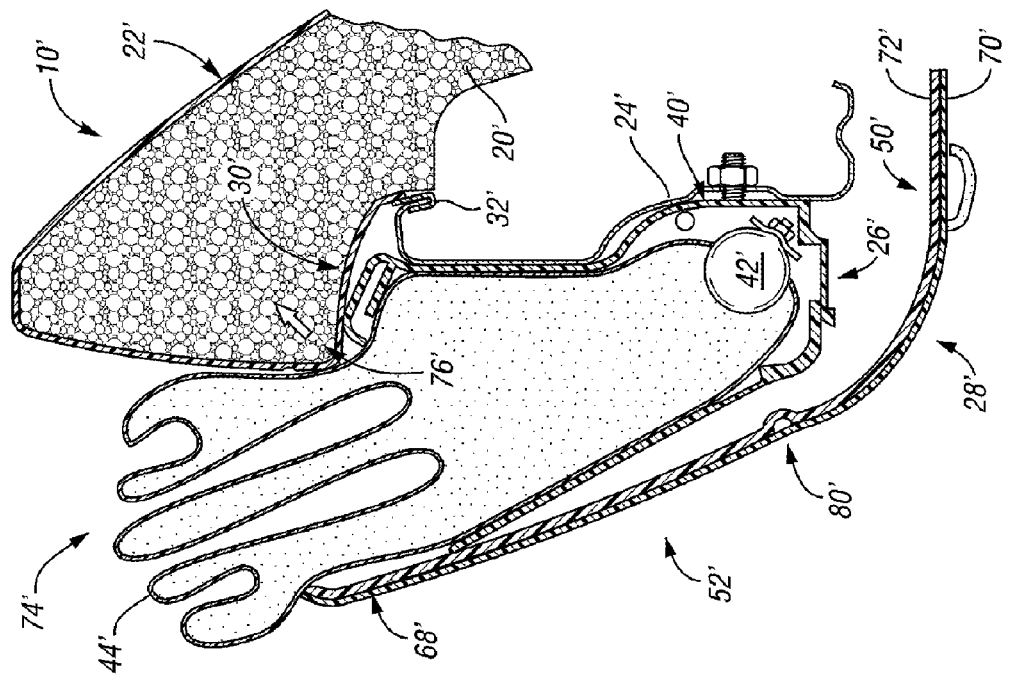
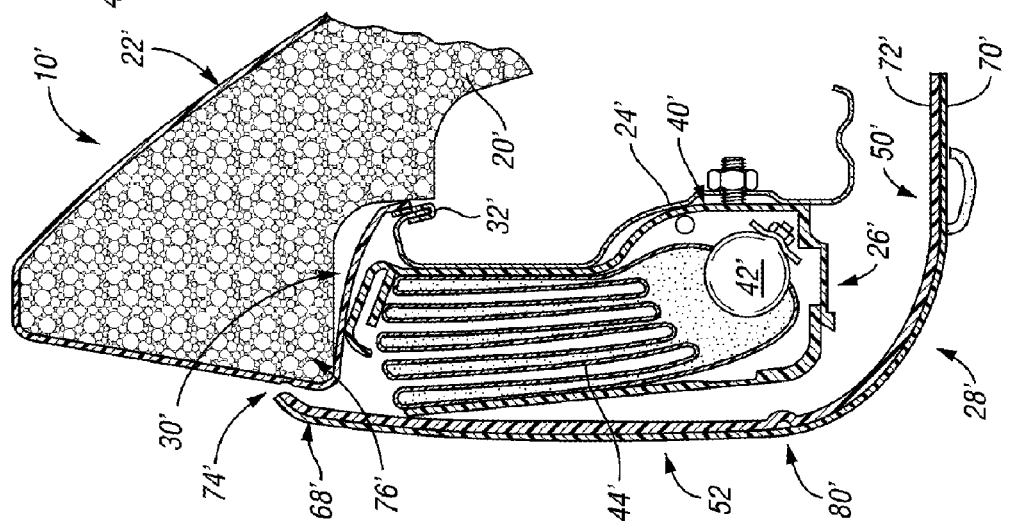
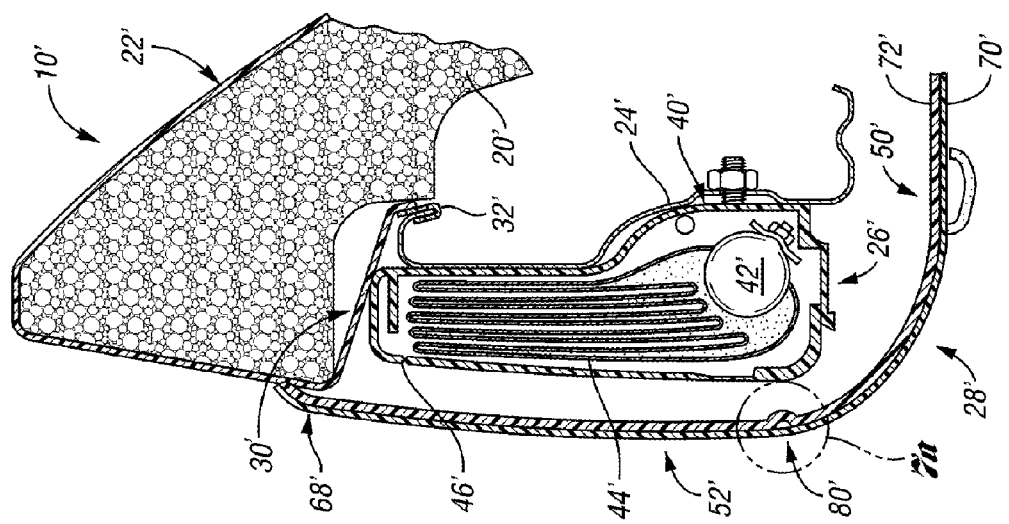

VEHICLE SEAT ASSEMBLY

BACKGROUND OF THE INVENTION

1. Field of the Invention

The present invention relates to a vehicle seat assembly, and in particular, a seat assembly including an air bag.

2. Background Art

Motor vehicles may be equipped with front and side air bags that are inflated to cushion an occupant during a vehicle impact event. Side air bags may be disposed within a vehicle seat assembly.

Previously, an air bag located within a vehicle seat assembly needed to sever or break through seating material or stitched seams before fully deploying to protect an occupant. For example, air bags that deployed through seat pad foam and a seat trim cover are described in U.S. Pat. Nos. 5,816,610, 5,938,232, and 6,045,151, while an air bag that breaks stitched seams that join seat trim cover surfaces is described in U.S. Pat. No. 5,860,673.

SUMMARY OF THE INVENTION

According to one aspect of the present invention, a vehicle seat assembly is provided. The vehicle seat assembly includes a frame, a cushion, a trim cover, an air bag module, and a back panel. The cushion is disposed proximate the frame. The trim cover is disposed proximate the cushion. The air bag module is disposed proximate the frame and includes an air bag and an inflator. The inflator is adapted to provide an inflation gas to inflate the air bag from a stored condition to an inflated condition. The back panel is configured to conceal the air bag module. The back panel has a free end detached from and disposed proximate to the trim cover when the air bag is in the stored condition. The back panel flexes such that a gap is formed between the free end and the trim cover when the air bag is inflated. The air bag deploys through the gap.

The free end may overlap the trim cover and compress the cushion when the air bag is in the stored condition.

The back panel may include a back portion and first and second lateral side portions that are integrally formed with the back portion. The first and second lateral side portions may form at least a portion of opposing first and second side surfaces of the vehicle seat assembly, respectively.

The back panel may include a hinge. A portion of the back panel may pivot about the hinge when the air bag is inflated. The back panel may include a substrate layer and a cover layer. The substrate layer may have a first surface disposed proximate the cover layer and a second surface disposed opposite the first surface. The hinge may be disposed on the first and/or second surfaces.

The cushion may include a corner portion covered by the back panel when the air bag is in the stored condition. The corner portion may be compressed by the air bag when the air bag is inflated.

According to another aspect of the present invention, a vehicle seat assembly is provided. The vehicle seat assembly includes a seat back and a seat bottom. The seat back is disposed proximate the seat bottom and includes a frame, a cushion, a trim cover, an air bag module, and a back panel. The cushion is associated with the frame. The trim cover is disposed proximate the cushion. A portion of the trim cover defines a front seat surface. The air bag module includes a housing, an air bag, and an inflator. The inflator is configured to supply an inflation gas to the air bag to facilitate deployment of the air bag. The back panel includes a back portion and a side portion. The side portion is disposed proximate the back portion. The side portion includes a free end that is detached from and disposed proximate to the trim cover when the air bag is deflated. The side portion extends further toward the front seat surface than the air bag module to conceal the air bag module when the air bag is deflated. The back panel flexes such that the free end moves away from the trim cover to form a gap through which the air bag deploys when the air bag is inflated.

The back panel may include a substrate layer and a cover layer disposed proximate the substrate layer. The side portion may include a hinge indentation formed on the substrate layer.

The cushion may include a corner portion disposed between the free end and the air bag module when the air bag is deflated. The corner portion may be compressed toward the front seat surface by the air bag when the air bag is inflated.

According to another aspect of the present invention, a vehicle seat assembly is provided. The vehicle seat assembly includes a frame, a cushion, a trim cover, and a back panel. The cushion is disposed proximate the frame. The trim cover is disposed proximate the cushion. The air bag module is disposed proximate the frame. The air bag module includes a housing, an air bag, and an inflator. The air bag is disposed proximate the housing. The inflator is adapted to provide an inflation gas to inflate the air bag from a stored condition to an inflated condition. The back panel is spaced apart from the air bag module and configured to conceal the air bag module when the air bag is in the stored condition. The back panel includes a hinge, a free end, and a side portion disposed between the hinge and the free end. The free end is detached from and disposed proximate to the trim cover when the air bag is in the stored condition. The side portion pivots about the hinge when the air bag is inflated to form a gap between the free end and the trim cover through which the air bag deploys.

BRIEF DESCRIPTION OF THE DRAWINGS

FIG. 5 is a fragmentary section of a second embodiment of the vehicle seat assembly taken through line 3-3.

FIGS. 6A-6B are fragmentary section views of exemplary embodiments of a hinge portion of the vehicle seat assembly.

DETAILED DESCRIPTION OF THE EMBODIMENT(S)

Figure 1:
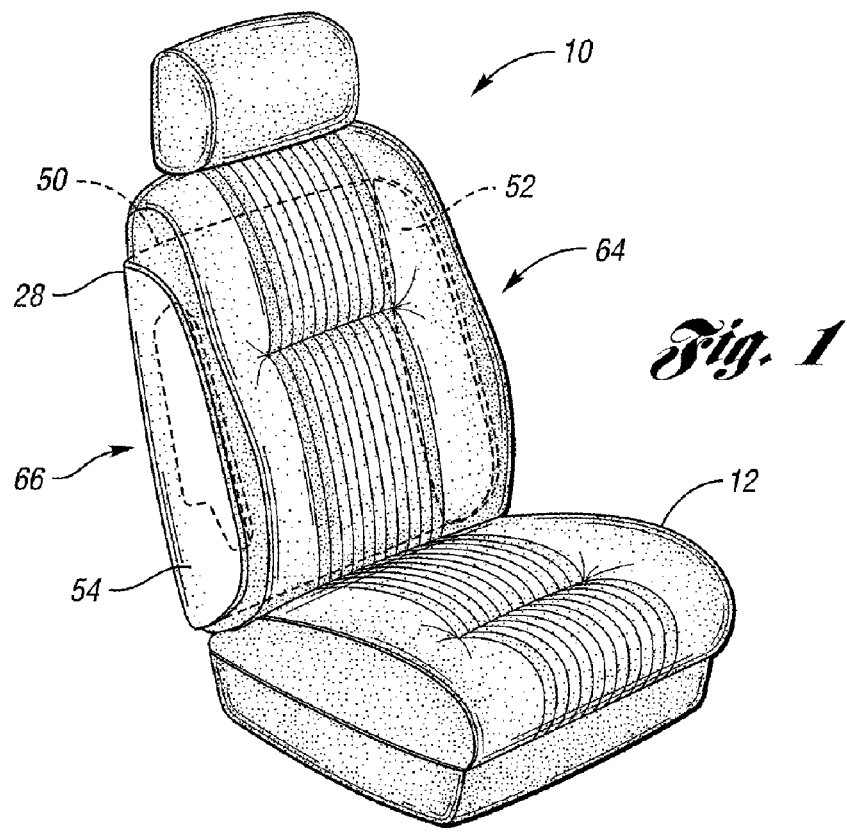
FIG. 1 is a perspective view of a vehicle seat assembly.

Referring to FIG. 1, a seat assembly 10 for a motor vehicle is shown. The seat assembly includes a seat bottom 12 and a seat back 14. The seat bottom 12 is adapted to be mounted on the vehicle. The seat back 14 is disposed proximate the seat bottom 12 and may be adapted to pivot with respect to the seat bottom 12.

Figure 2:
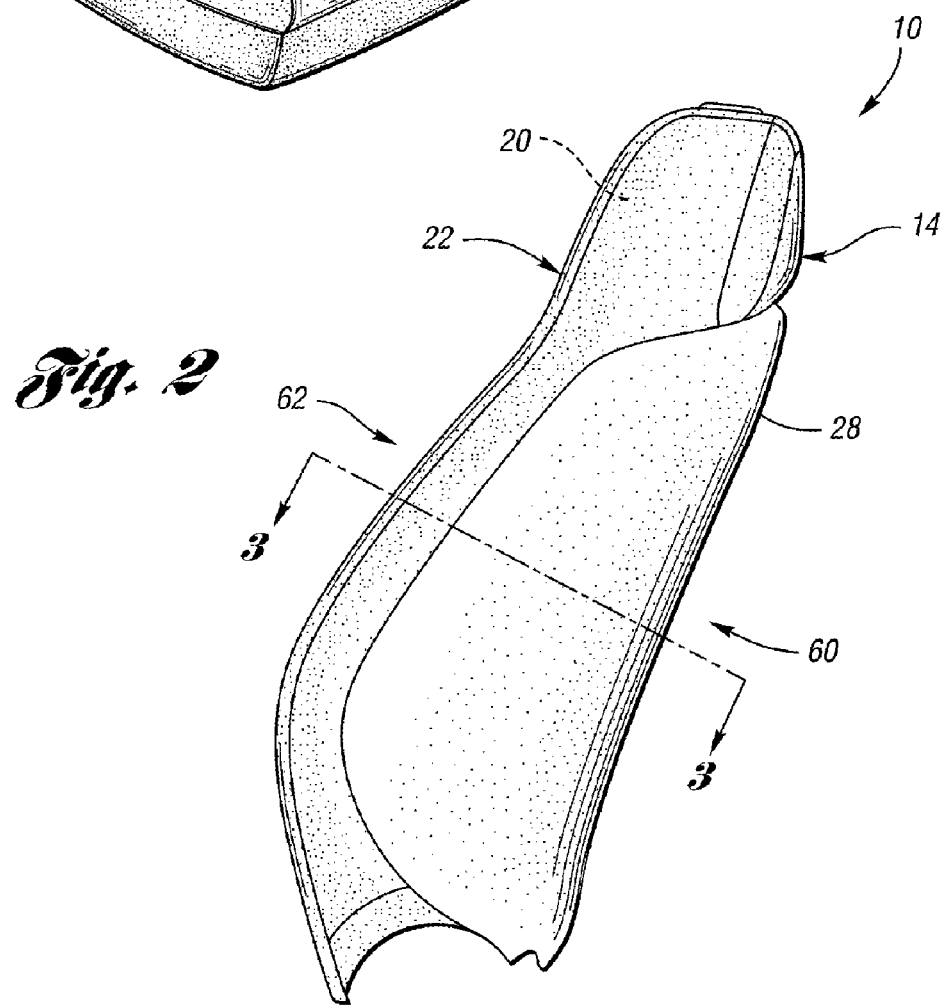
FIG. 2 is a side view of a portion of the vehicle seat assembly shown in FIG. 1.
Figure 3:
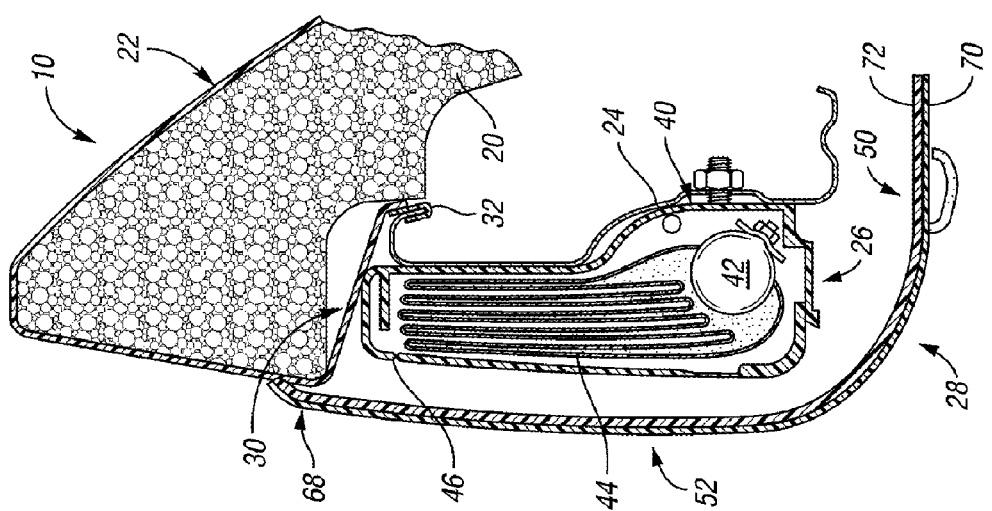
FIG. 3 is a fragmentary section view of a first embodiment of the vehicle seat assembly taken through line 3-3.

Referring to FIGS. 2 and 3, the seat back 14 is shown in more detail. In the embodiment shown, the seat back 14 includes a seat pad or cushion 20, a trim cover 22, a frame 24, an air bag module 26, and a back panel 28.

The cushion 20 may have any suitable configuration and may be made of any suitable material, such as molded polymeric material like polyurethane foam. In the embodiment shown, the cushion 20 is disposed proximate the frame 24 and may be attached to the frame 24 at various locations.

The trim cover 22 is configured to form an exterior surface of the seat assembly 10. The trim cover 22 may be made of any suitable material, such as fabric, vinyl, and/or leather. The trim cover may be disposed proximate one or more surfaces of the cushion 20. In addition, the trim cover 22 may be attached to the cushion 20 in any suitable manner, such as with an adhesive, stitching, or fastener. In the embodiment shown, the trim cover 22 includes an end 30 that is detached from the cushion 20. The end 30 may be secured to the frame 24 using a fastener, such as a clip 32.

The frame 24 may have any suitable configuration and may be made of any suitable material, such as a polymeric material or metal. The frame 24 provides a support structure for the seat back 14.

The air bag module 26 includes a housing 40, an inflator 42, and an air bag 44. The air bag module 26 may be disposed in any suitable location. In the embodiment shown in FIG. 3, the air bag module 26 is disposed proximate the frame 24.

The housing 40 is configured to receive at least a portion of the air bag 44 when the air bag 44 is deflated. The housing 40 may have any suitable configuration. In the embodiment shown, the housing 40 includes an optional frangible portion 46 that is adapted to tear or sever in response to force exerted by the air bag 44 when the air bag 44 is inflated.

The inflator 42 is adapted to provide an inflation gas to the air bag 44. The inflator 42 may be disposed in any suitable location. In the embodiment shown in FIG. 3, the inflator 42 is disposed within the housing 40. Alternatively, the inflator 42 may be disposed outside the housing 40 and connected to the air bag 44 via a tube.

The air bag 44 is configured to expand from a stored condition to an inflated or deployed condition when the inflation gas is provided. More specifically, the air bag 44 is deflated and concealed by the housing 40 and/or back panel 28 when in the stored condition and is inflated and positioned between a seat occupant and an interior vehicle surface when in the inflated condition. In FIG. 3, the air bag 44 is shown in the stored condition.

The air bag 44 may have any suitable configuration and may be made of any suitable material. For example, the air bag 44 may be made of multiple panels that are assembled in any suitable manner, such as by stitching, bonding, or with an adhesive. Alternatively, the air bag 44 may be integrally formed. Optionally, the air bag 44 may include one or more tethers that control the shape of the air bag 44 upon deployment. The air bag 44 may be configured to cushion the head, thorax, and/or pelvis of the seat occupant when deployed.

The back panel 28 may have any suitable configuration. For example, the back panel 28 may wrap around the back and one or more sides of the seat assembly 10. In the embodiment shown in FIGS. 1-3, the back panel 28 includes a back portion 50, a first side portion 52, and a second side portion 54. The back portion 50 extends across a back side 60 of the seat assembly 10. The first and second side portions 52,54 extend from the back portion 50 toward the seating surface or front side 62 of the seat assembly 10. The first side portion 52 is disposed proximate a first side 64 of the seat assembly 10. The second side portion 54 is disposed proximate the second side 66 of the seat assembly 10 disposed opposite the first side 64. The back and side portions 50,52,54 may be integrally formed.

The back panel 28 is configured to conceal the air bag module 26 prior to air bag deployment. In the embodiment shown, the first side portion 52 extends further toward the front side 62 of the seat assembly 10 than the air bag module 26 to conceal the air bag module 26 when the air bag 44 is in the stored condition. The first side portion 52 may be spaced apart from the air bag module 26 such that a gap is formed. Optionally, a filler material may be disposed between the air bag module 26 and an interior surface of the back panel 28.

The first and/or second side portions 52,54 may include an end portion 68. The end portion 68 is disposed proximate, but not attached to the trim cover 22 when the air bag 44 is in the stored condition. The end portion 68 may be angled toward the trim cover 22 and may compress the cushion 20 to provide a gap-free appearance.

The back panel 28 may be attached to the seat assembly 10 in any suitable manner, such as with hooks, fasteners, and/or an adhesive.

The back panel 28 may have one or more layers. In the embodiment shown in FIG. 3, the back panel 28 includes a cover layer 70 and a substrate layer 72. The cover layer 70, which forms an exterior surface of the back panel 28, may be made of any suitable material, such as polymeric material, cloth, or leather. The substrate layer 72 is disposed proximate the cover layer 70. The substrate layer 72 may also be formed of any suitable material, such as a polymeric material like polypropylene. The cover and substrate layers 70,72 may be joined in any suitable manner, such as with an adhesive.

The back panel 28 is configured to flex in response to force exerted by the air bag 44 when the air bag 44 is inflated. The portions of the back panel 28 that flex may be detached from the seat assembly 10 to facilitate movement. Optionally, the back panel 28 may include a hinge as described in detail below.

Figure 4B:
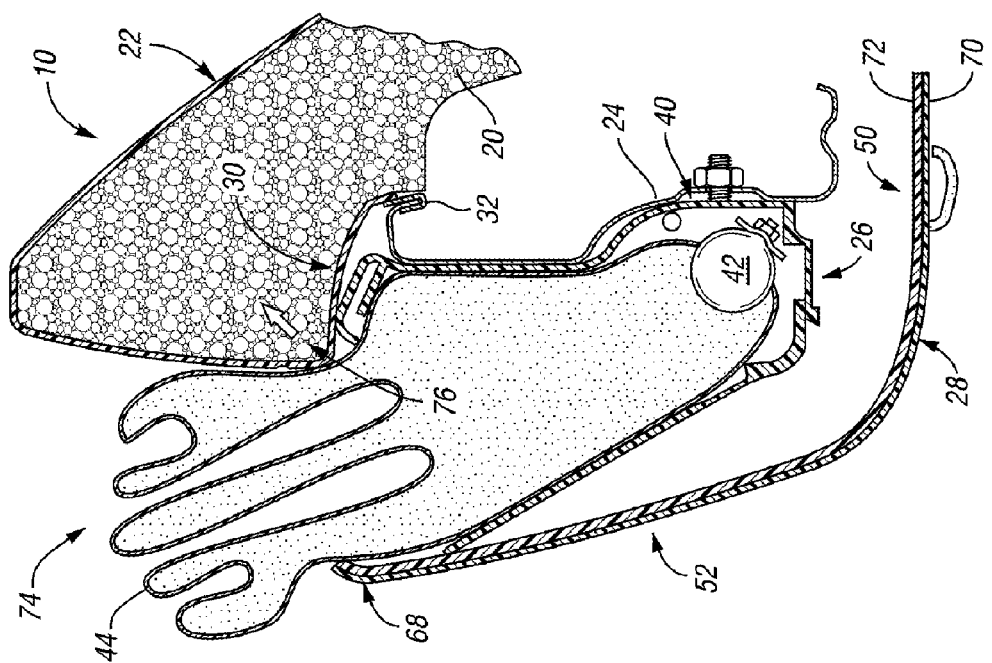
FIGS. 4A-4B are fragmentary section views of the vehicle seat assembly shown in FIG. 3, illustrating deployment of an air bag.
Figure 4A:
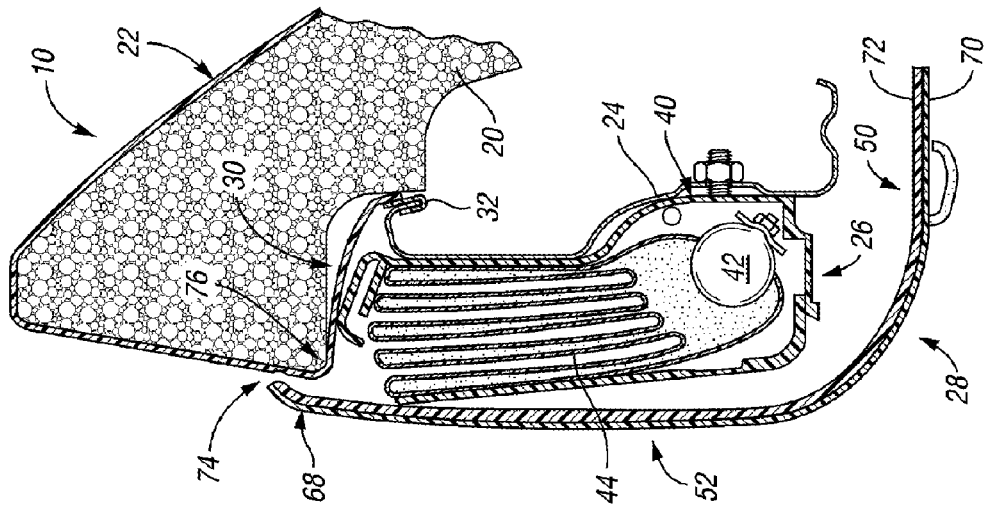

Referring to FIGS. 4A-4B, an air bag deployment sequence for one embodiment of the present invention is shown. In this embodiment, the back panel 28 does not include a hinge.

In FIG. 4A, the air bag 44 has just started to be inflated. As the air bag 44 is inflated, it exerts force on the housing 40, causing the frangible portion 46 to separate and move toward the back panel 28. As additional inflation gas is provided, the air bag 44 expands from the housing 40 toward the back panel 28. Force exerted by the air bag 44 causes the back panel 28 to flex such that the end portion 68 moves away from the trim cover 22. A gap 74 is formed between the end portion 68 and the trim cover 22 and cushion 20 through which the air bag 44 deploys.

In FIG. 4B, the air bag 44 is shown later in the deployment sequence. As the air bag 44 inflates, it continues to exert force and the back panel 28 continues to flex. As a result, the end portion 68 moves further away from the trim cover 22 and cushion 20, increasing the size of the gap 74. The air bag 44 expands into and through the gap 74 and toward a target position between the seat occupant and an interior vehicle surface. In addition, the air bag 44 may also exert force on the cushion 20 as it deploys. In the embodiment shown, the air bag 44 at least partially compresses a corner portion 76 of the cushion 20 toward the front side 62 of the seat assembly 10 in the direction indicated by the arrow. The corner portion 76 is disposed near the gap 74 and is concealed by the end portion 68 when the air bag 44 is in the stored condition. In addition, the trim cover 22 may also be compressed against the cushion 20 by the housing to remove a gap between the trim cover 22 and the cushion 20 when the air bag 44 is inflated.

Referring to FIG. 5, another embodiment of the present invention is shown. In this embodiment, the seat assembly 10' is similar to the embodiment shown in FIG. 2. The seat assembly 10' includes a cushion 20', a trim cover 22', a frame 24', an air bag module 26', a back panel 28', a housing 40', an inflator 42', an air bag 44', a frangible portion 46', a back portion 50', a side portion 52', an end portion 68', a cover layer 70', a substrate layer 72', and a hinge 80'.

The hinge 80' may be disposed on the back panel 28' in any suitable location. In the embodiment shown, the hinge 80' is disposed proximate the side portion 52'. Alternatively, the hinge 80' may be disposed on the back portion 50'. The hinge 80' may extend between the top and bottom of the back panel 28' and may be linear or curved. In addition, the hinge 80' may be continuous or include a plurality of spaced-apart hinge portions or indentations. The hinge 80' may be configured not to tear or sever when the air bag 44' is deployed.

Referring to FIGS. 6A-6B, two exemplary embodiments of the hinge 80' are shown. The hinge 80' may have any suitable configuration and may be disposed on the cover layer 70' and/or substrate layer 72'. In the embodiments shown in FIGS. 6A-6B, the hinge 80' is disposed on the substrate layer 72', thereby permitting the back panel 28' to have a seamless appearance. In FIG. 6A, the hinge 80' is disposed on a first surface 82' and extends away from the cover layer 70'. As such, a void 84' may be formed between the hinge 80' and the cover layer 70'. In FIG. 6B, the hinge 80' is disposed on a second surface 86' and extends toward the cover layer 70'. Optionally, the hinge 80' may be disposed on any surface or combination of surfaces of the cover and/or substrate layers 70', 72'.

Figure 7A:
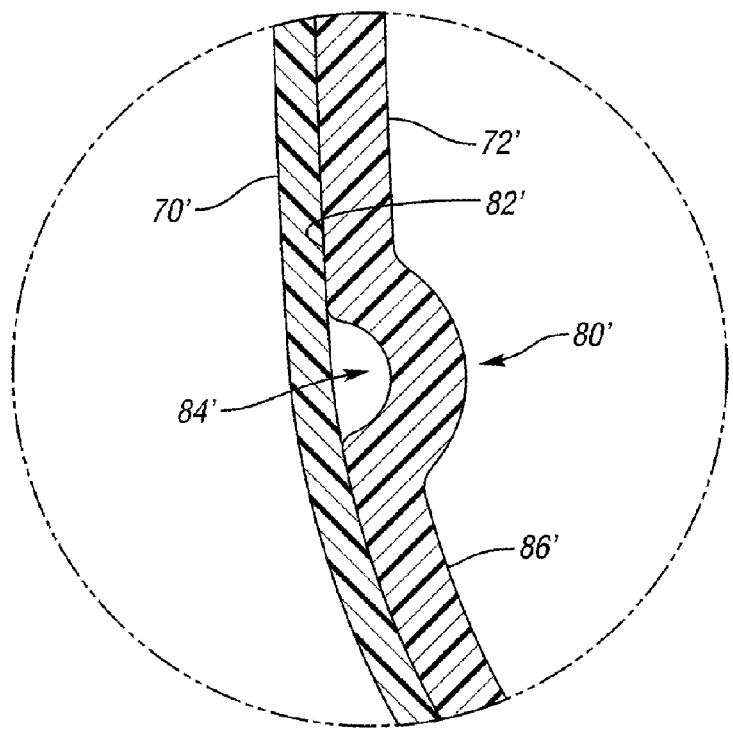
FIGS. 7A-7B are fragmentary section views of the vehicle seat assembly shown in FIG. 5, illustrating deployment of an air bag.
Figure 7B:
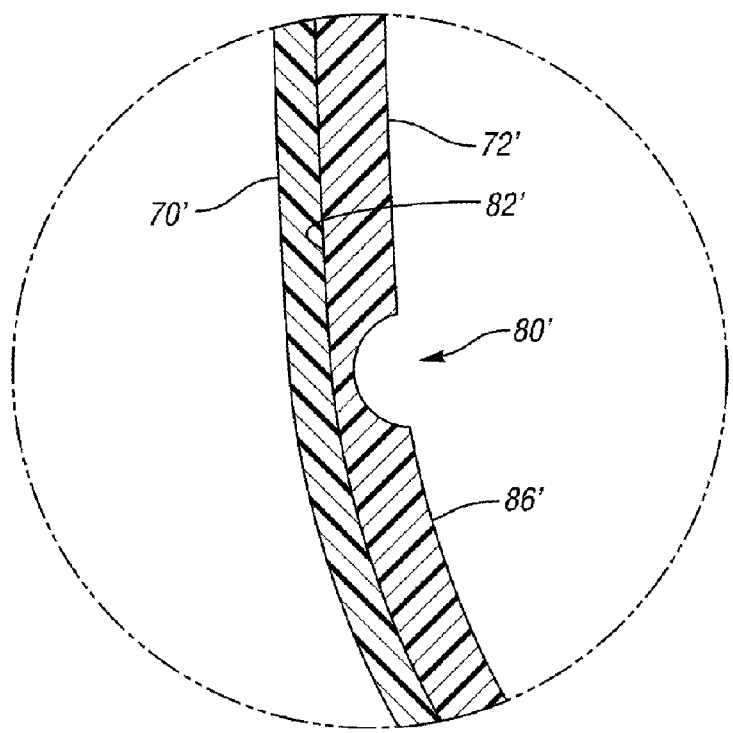

Referring to FIGS. 7A-7B, an air bag deployment sequence for the embodiment of the present invention shown in FIG. 5 is shown.

In FIG. 7A, the air bag 44' has just started to be inflated. As the air bag 44' is inflated, it exerts force on the housing 40', causing the frangible portion 46' to separate and move toward the back panel 28'. As additional inflation gas is provided, the air bag 44' expands from the housing 40' toward the back panel 28'. Force exerted by the air bag 44' causes the side portion of the back panel 28' to pivot about the hinge 80'. As such, the end portion 68' moves away from the trim cover 22'. A gap 88' is formed between the end portion 68' and the trim cover 22' and cushion 20' through which the air bag 44' deploys.

In FIG. 7B, the air bag 44' is shown later in the deployment sequence. As the air bag 44' inflates, it continues to exert force on the back panel 28'. As a result, the end portion 68' moves further away from the trim cover 22' and cushion 20', increasing the size of the gap 88'. The air bag 44' expands into and through the gap 88' and toward a target position between the seat occupant and an interior vehicle surface. In addition, the air bag 44' may also exert force on and compress a portion of the cushion 20' as previously described.

The seat assembly of the present invention permits an air bag to deploy without severing stitches that join one or more trim panels. In addition, the present invention also permits an air bag to deploy without having to compress a seat cushion to create an aperture suitable for air bag deployment. As a result, air bag deployment time is reduced. Moreover, the present invention reduces manufacturing costs in that additional manufacturing steps associated with creating an air bag deployment path through the trim cover and/or cushion may be eliminated. Furthermore, the present invention also eliminates the tearing of foam, trim covers, and/or trim cover stitching when an air bag is deployed. As a result, the seat assembly may not require extensive repairs or replacement after an air bag is deployed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
   a frame;
   a cushion disposed proximate the frame, the cushion having a corner portion;
   a trim cover disposed proximate the cushion;
   an air bag module disposed proximate the frame, the air bag module having an air bag, an inflator adapted to provide an inflation gas to inflate the air bag from a stored condition to an inflated condition, and a housing disposed completely around the air bag when the air bag is in the stored condition, wherein the housing contacts the air bag and the frame and does not contact the cushion when the air bag is in the stored condition; and
   a back panel configured to conceal the air bag module, the back panel being spaced apart from the housing and having a free end detached from and disposed proximate to the trim cover when the air bag is in the stored condition;
   wherein the back panel flexes but does not sever to create a gap between the free end and the trim cover through which the air bag deploys when the air bag is inflated; and
   wherein the back panel covers the corner portion and does not contact the cushion when the air bag is in the stored condition and wherein the corner portion is compressed by the air bag when the air bag is inflated.

2. The vehicle seat assembly of claim 1 wherein the back panel further comprises a substrate layer, a cover layer, and a hinge portion disposed between the substrate and cover layers.

3. The vehicle seat assembly of claim 1 wherein the back panel includes a back portion and first and second lateral side portions integrally formed with the back portion, the first and second lateral side portions forming at least a portion of opposing first and second side surfaces of the vehicle seat assembly, respectively.

4. The vehicle seat assembly of claim 1 wherein the back panel is spaced apart from the air bag module such that an air gap is formed between the back panel and the air bag module.

5. The vehicle seat assembly of claim 1 wherein the back panel further comprises a hinge portion about which a portion of the back panel pivots when the air bag is inflated.

6. The vehicle seat assembly of claim 5 wherein the back panel further comprises a substrate layer and a cover layer, the substrate layer having a first surface disposed proximate the cover layer and a second surface disposed opposite the first surface, and wherein the hinge portion is disposed on the first surface such that a void is formed between the hinge portion and the cover layer.

7. The vehicle seat assembly of claim 5 wherein the back panel further comprises a substrate layer and a cover layer, the substrate layer having a first surface disposed proximate the cover layer and a second surface disposed opposite the first surface, and wherein the hinge portion is disposed on the second surface.

8. The vehicle seat assembly of claim 1 wherein the housing contacts the back panel when the air bag is inflated.

9. A vehicle seat assembly, comprising:
a seat bottom; and
a seat back disposed proximate the seat bottom, the seat back including:
a frame,
a cushion associated with the frame,
a trim cover disposed proximate the cushion, a portion of the trim cover defining a front seat surface,
an air bag module including a single housing directly coupled to the frame and spaced apart from the cushion, the housing having a frangible portion disposed on a side of the housing disposed opposite the frame, an air bag, and an inflator configured to supply an inflation gas to the air bag, thereby facilitating deployment of the airbag, and
a back panel that does not contact the housing or the cushion when the air bag is deflated and having a back portion and a side portion disposed proximate the back portion, the side portion having a free end that is detached from and disposed proximate to the trim cover when the air bag is deflated;
wherein the side portion extends further toward the front seat surface than the air bag module to conceal the air bag module when the air bag is deflated and the back panel flexes such that the free end moves away from the trim cover to form a gap through which the air bag deploys and the cushion is compressed and the frangible portion severs when the air bag is inflated.

10. The vehicle seat assembly of claim 9 wherein the free end compresses the cushion when the free end is disposed proximate the trim cover.

11. The vehicle seat assembly of claim 9 wherein the back panel further comprises a substrate layer and a cover layer disposed proximate the substrate layer.

12. The vehicle seat assembly of claim 11 wherein the side portion further comprises a hinge indentation formed on the substrate layer.

13. The vehicle seat assembly of claim 9 wherein the cushion further comprises a corner portion disposed between the free end and the air bag module when the air bag is deflated, and wherein the corner portion is compressed toward the front seat surface by the air bag when the air bag is inflated.

14. A vehicle seat assembly, comprising:
a frame;
a cushion disposed proximate the frame;
a trim cover disposed proximate the cushion;
an air bag module disposed proximate the frame, the air bag module including a housing, an air bag disposed proximate the housing, and an inflator adapted to provide an inflation gas to inflate the air bag from a stored condition to an inflated condition; and
a back panel spaced apart from the air bag module and configured to conceal the air bag module when the air bag is in the stored condition, the back panel including a hinge, a free end, and a side portion disposed between the hinge and the free end;
wherein the free end is disposed proximate but not attached to the trim cover when the air bag is in the stored condition and the side portion pivots about the hinge when the air bag is inflated to form a gap between the free end and the trim cover through which the air bag deploys and wherein the trim cover is compressed against the cushion by the housing to remove a gap between the trim cover and the cushion when the air bag is inflated.

15. The vehicle seat assembly of claim 14 wherein the hinge is integrally formed in the back panel.

16. The vehicle seat assembly of claim 14 wherein the back panel further comprises a substrate layer and a cover layer, the substrate layer having a first surface disposed proximate the cover layer and a second surface disposed opposite the first surface.

17. The vehicle seat assembly of claim 16 wherein the substrate layer includes the hinge.

18. The vehicle seat assembly of claim 16 wherein the hinge is an indentation disposed on the first surface.

19. The vehicle seat assembly of claim 16 wherein the hinge is an indentation disposed on the second surface.

20. The vehicle seat assembly of claim 14 further comprising a back side and first and second opposing lateral sides and the back panel further comprises a back portion disposed proximate the back side, and first and second side portions disposed proximate the first and second opposing lateral sides, respectively.

* * * * *